Feb. 5, 1963   J. R. TURK   3,076,613
COIL WINDING APPARATUS
Filed Oct. 10, 1960   7 Sheets-Sheet 1
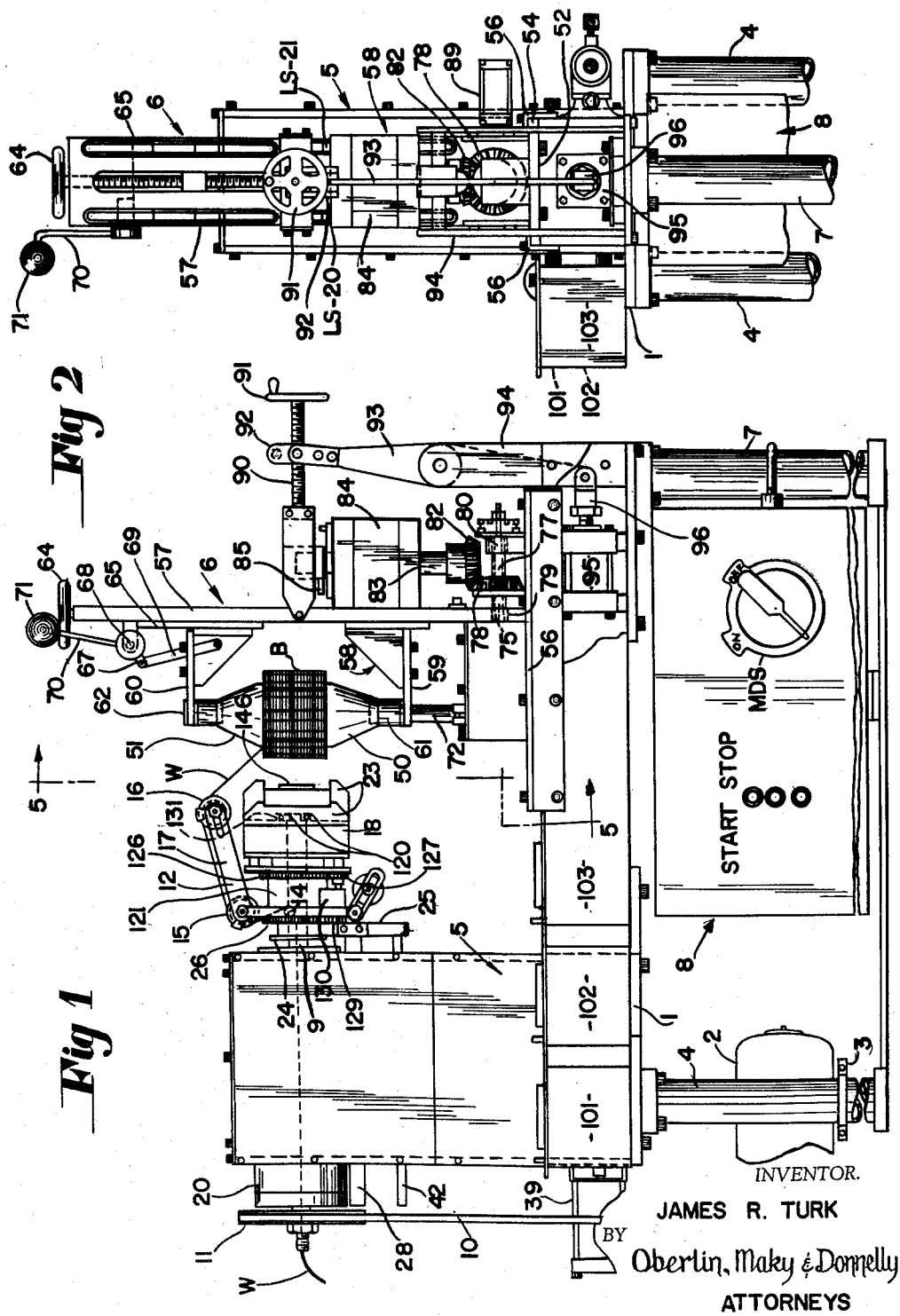
INVENTOR.
JAMES R. TURK
BY Oberlin, Maky & Donnelly
ATTORNEYS

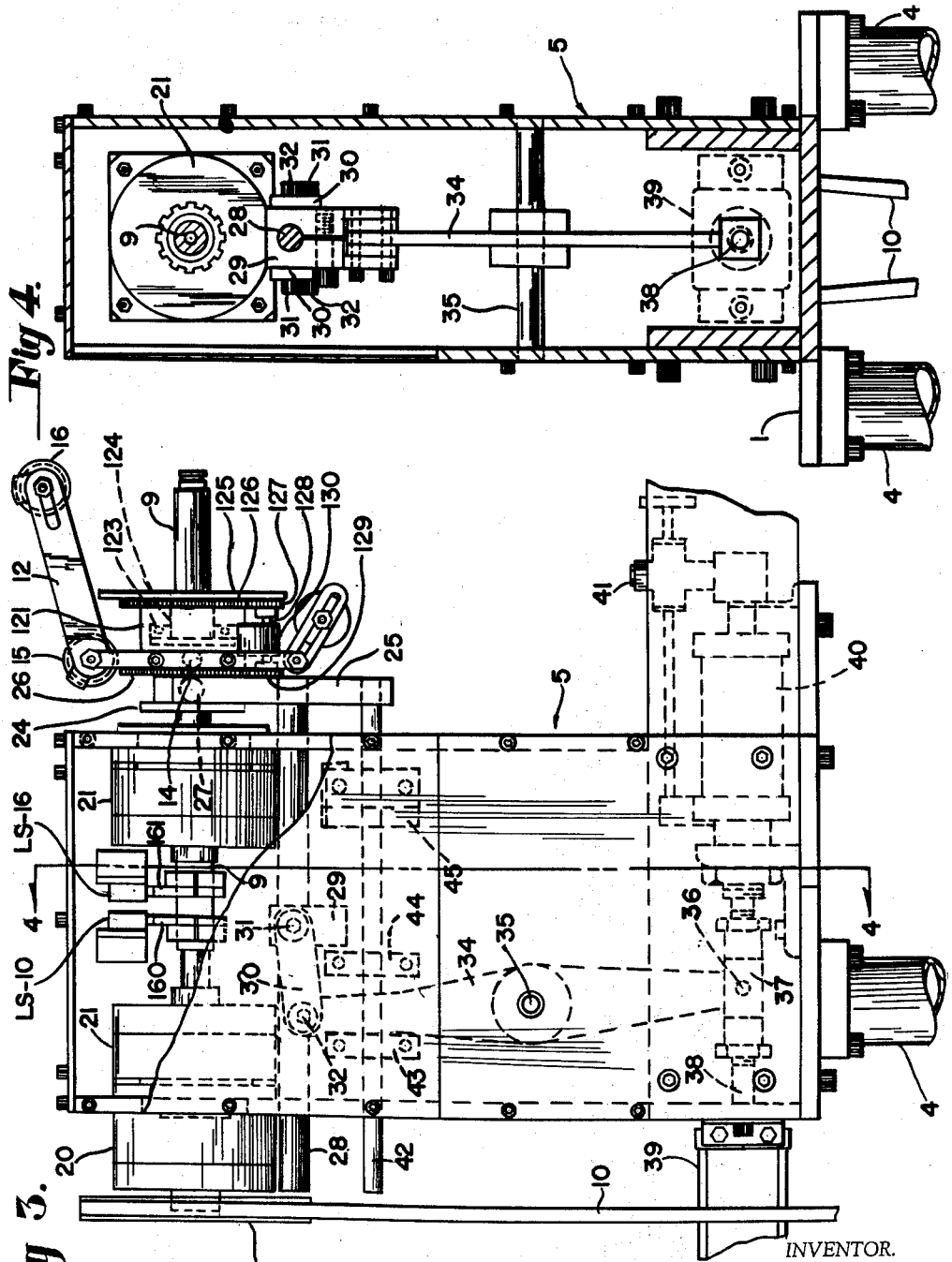

INVENTOR.
JAMES R TURK
BY
Oberlin, Maky & Donnelly
ATTORNEYS

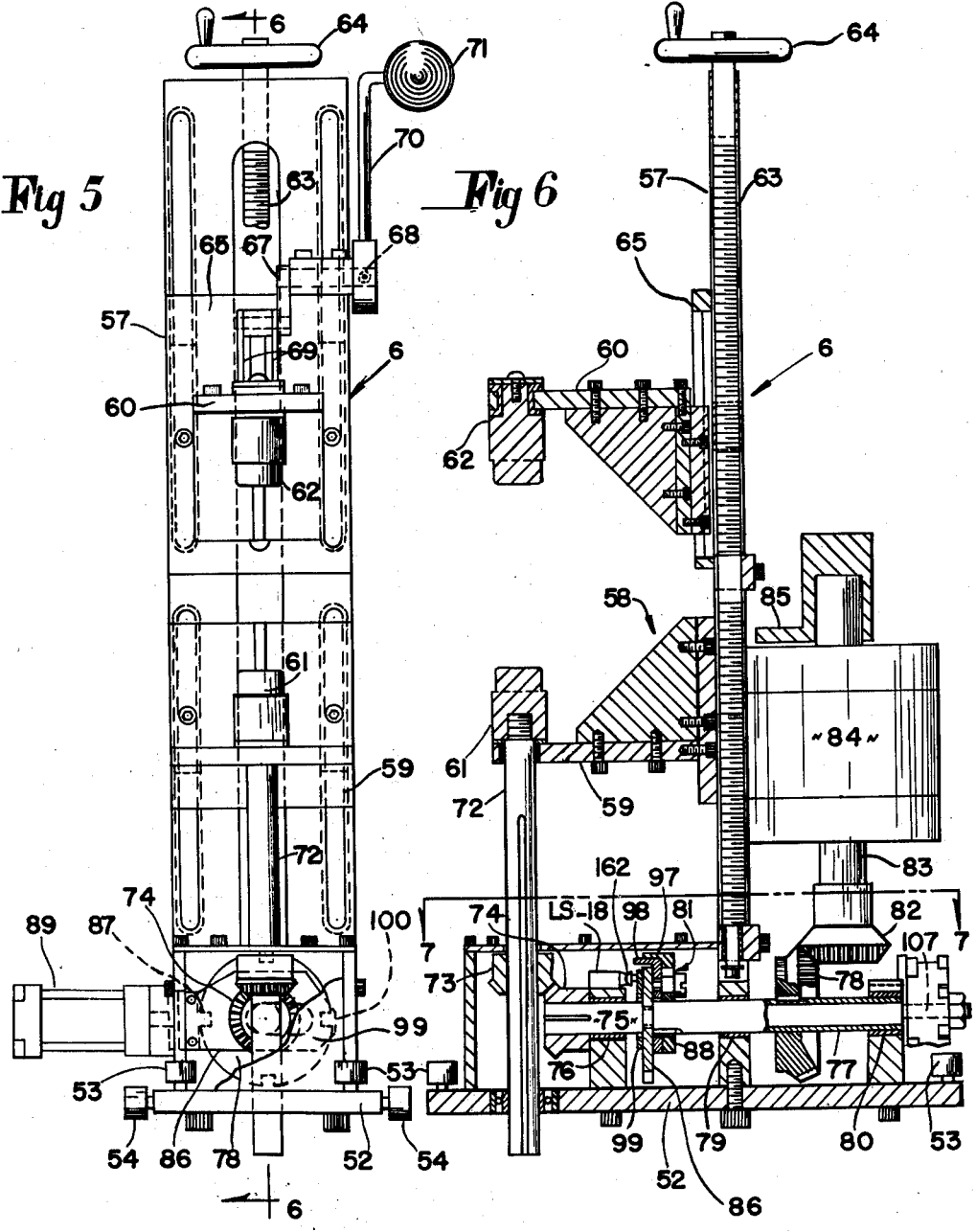

INVENTOR.
JAMES R. TURK
BY
Oberlin, Maky & Donnelly
ATTORNEYS

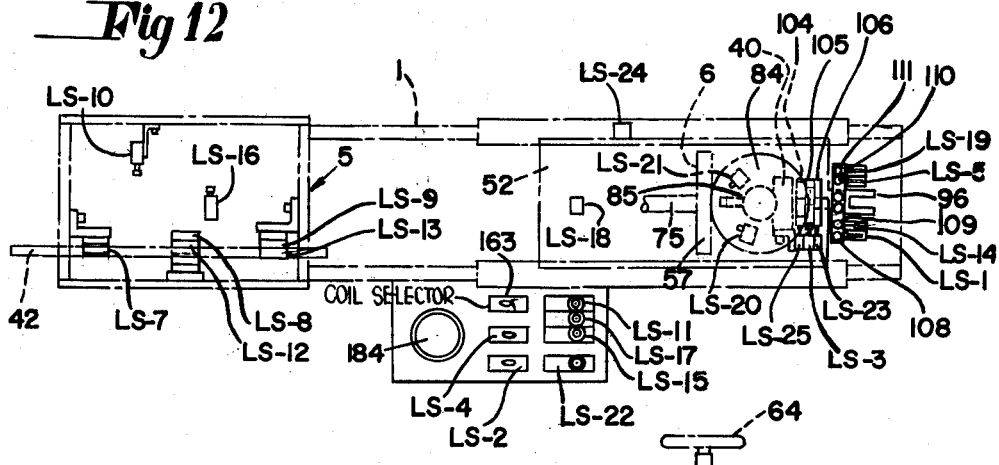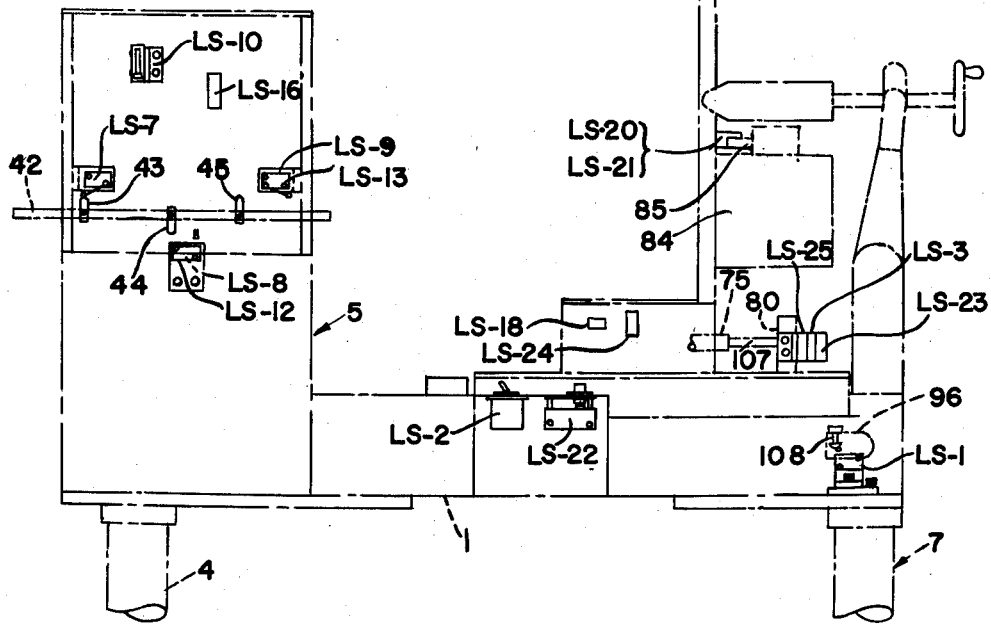

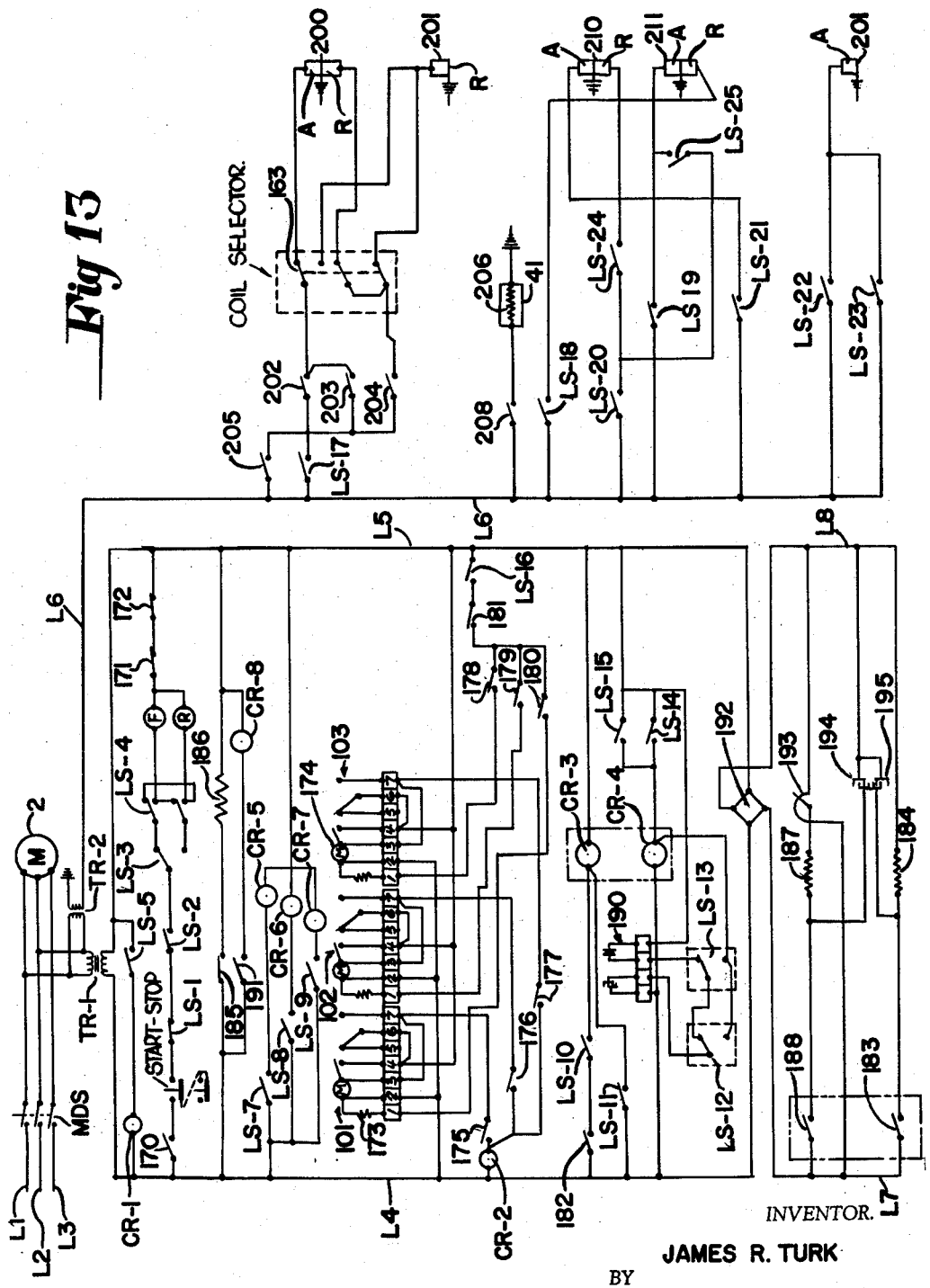

United States Patent Office 3,076,613
Patented Feb. 5, 1963

3,076,613
COIL WINDING APPARATUS
James R. Turk, Euclid, Ohio, assignor to Vincent K.
Smith, Gates Mills, Ohio
Filed Oct. 10, 1960, Ser. No. 61,557
14 Claims. (Cl. 242—13)

The present invention relates generally as indicated to a coil winding apparatus for winding coils for dynamo-electric machines, transformers, inductors, electromagnets, etc. More particularly, the present invention relates to a coil winding apparatus for forming so-called "concentric windings" in the slots of the laminated stators of induction motors.

As is known in the art, a concentric winding is one in which each pole group comprises a plurality of coils so wound in pairs of stator slots that each coil has a different throw and that the centers of all the coils in a given pole group coincide.

Insofar as the stator assembly herein shown is concerned reference may be had to the Vincent K. Smith Patent No. 2,565,530, granted August 28, 1951. Said patent discloses a stator construction which is of composite form including an inner, externally slotted annular component for so-called spider, into the slots of which wire coils are wound. The wound spider is then tightly fitted within an outer annular component or so-called yoke, which, as the spider, comprises a stack of sheet metal stampings or laminations. Numerous advantages flow from this type of stator construction. For example, there is less windage loss and no harmonic noises because of the smooth inner bore of the assembly; a smaller air gap is possible also because of the smooth bore; the flux path is modified to result in a quieter motor; the wire may be better packed in exterior slots than in interior slots, as in conventional stators, whereby the coils have a greater number of turns for a prescribed size of stator, thus resulting in improved performance; the smooth uninterrupted bore results in even flux distribution in the air gap for improved performance; the packing of a prescribed number of turns in smaller slots permits increased tooth width to contribute to improved performance as a result of better flux paths; and the coils may be wound with shorter end loops and thus less copper and lower $I^2R$ loss.

With reference to coil winding apparatus which has utility in forming concentric windings in stators for induction motors and the like reference may be had to the copending application of Bertram H. C. Hambleton, Serial No. 636,959, filed January 29, 1957, now Patent No. 3,006,564, issued Oct. 31, 1961. In general, the coil winding apparatus disclosed in said Hambleton application resembles the coil winding apparatus herein; however, one basic distinction resides in the simple and efficient form of winding head employed in the present case.

Accordingly, it is a primary object of this invention to provide an automatic coil winding apparatus in which a lightweight winding element revolves about the stationary slotted body, thus enabling rapid starting and accurate instantaneous stopping of the movement of such element. This is in contrast to ordinary coil winding machines of the so-called "spinner" type in which slotted body and wire guides are rapidly rotated with respect to a wire feed arm, whereby large inertia forces are encountered during rapid starting and stopping of the wire guide. Herein, the slotted body and wire guide are stationary and only the lightweight element or flyer arm is alternately started and stopped so as not to require heavy duty braking equipment.

It is another object of this invention to provide a simple and efficient form of winding head or wire guide which is arranged to automatically form concentric windings.

It is another object of this invention to provide a novel mounting for the winding head which holds the winding head in a position with its wire guide wings parallel to the slots of the slotted body and which provides a bearing for the overhanging front end of the flyer arm drive shaft.

Another object of this invention is to provide a coil winding apparatus that may be used to wind concentric coils successively and automatically.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a side elevation view of a preferred embodiment of the present invention;

FIG. 2 is an end elevation view as viewed from the right-hand end of FIG. 1;

FIG. 3 is a fragmentary enlarged view of the flyer arm or winding element and the rotary drive shaft therefor upon which the winding head is adapted to be fixedly mounted;

FIG. 4 is a cross-section view taken substantially along the line 4—4, FIG. 3;

FIG. 5 is an enlarged elevation view as viewed substantially along the line 5—5, FIG. 1 with the body to be wound removed;

FIG. 6 is a cross-section view taken substantially along the line 6—6 of FIG. 5;

Figure 8:
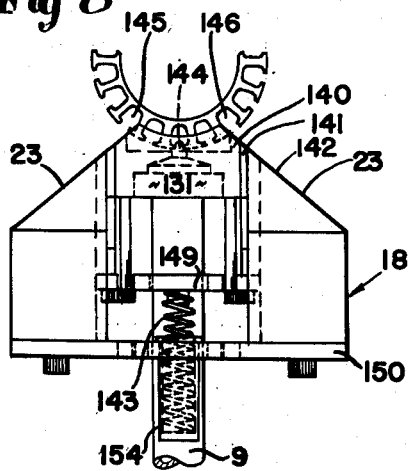
Figure 9:
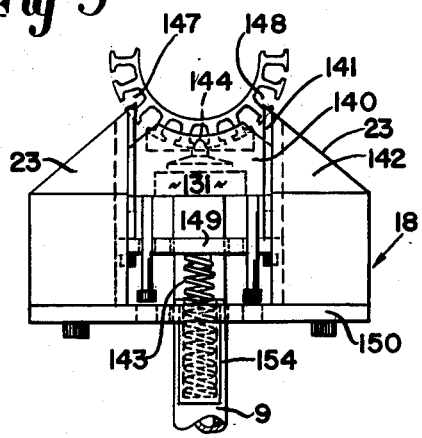
Figure 10:
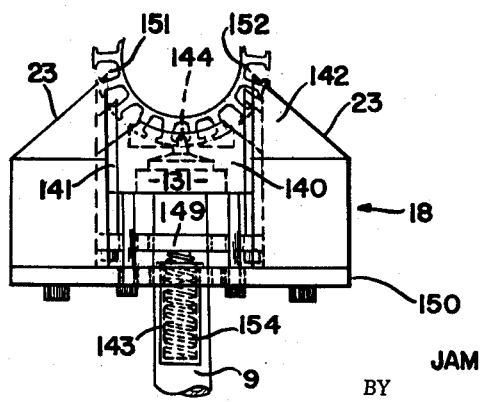

FIGS. 8, 9, and 10 are fragmentary top plan views on enlarged scale showing the winding head in three different positions for winding each of the pole groups of a stator with three concentric coils;

FIGS. 11 and 12 are side elevation and top plan views illustrating the preferred locations of the switches and controls by which automatic operation of the present apparatus is achieved; and FIG. 13 is a schematic wiring diagram showing the connections of such switches to valves, cylinders, motors, and the like, for achieving the desired automatic and sequential actuation of the various components of the coil winding apparatus.

I. The Coil Winding Apparatus as a Whole
(FIGS. 1 and 2)

In the example of the coil winding apparatus herein disclosed there is provided a base 1 which mounts an electric drive motor 2 on a platform 3 between the legs 4 at the left end of the base, and which has mounted on the top thereof a headstock assembly 5 and a tailstock assembly 6, the latter being adapted to mount thereon the externally slotted body B in which coils of wire W are to be wound as hereinafter described. Hung beneath the base 1, as on the leg 7 at the right, is the program controller system 8 that includes appropriate controls, terminal strips, transformers, and the like to which the counters, switches, solenoid valves, etc. are wired to obtain automatic sequential operation of the apparatus responsive to the counters which are preset and activated sequentially upon winding of a predetermined number of turns of the coil in one pair of slots to commence winding of a predetermined number of turns in the next coil, etc.

Journalled in the headstock 5 is a tubular drive shaft 9 that is driven by a variable speed pulley (not shown) on the drive shaft of motor 2, there being a belt 10 trained over that pulley and a pulley 11 on the drive shaft 9. As shown, the tubular drive shaft 9 carries an adjustable flyer or winding arm 12, and extending through the hollow shaft 9 is the wire W which is to be wound into coils in selected pairs of slots of the body B. The wire W emerges through a radial slot in the drive shaft 9 and passes over a sheave 14 disposed in such slot and over sheaves 15 and 16 mounted on the flyer arm 12. It is to be noted that the flyer arm 12, at its terminal end, comprises a separate link 17 which may be adjusted to move the sheave 16 closer to or farther from the winding guide head 18, the sheave 16, in turn, being mounted in a longitudinal slot of the link 17 for positioning of said sheave 16 different desired distances from the slotted body B.

The headstock 5, as best shown in FIG. 3, is provided as with an electromagnetic clutch 20 and with electromagnetic brakes 21, which when energized are effective to disengage the pulley 11 from shaft 9 and to arrest rotation of the flyer arm 12 and drive shaft 9. Thus, the brakes 21 need only overcome the inertia of the relatively lightweight drive shaft 9 and flyer arm 12. In this case, the winding head 18 is mounted on the right hand end of the drive shaft 9 in fixed position and provides a bearing for rotation of the drive shaft 9 therein in a manner hereinafter described in detail. Basically, the winding head 18 herein shown comprises three sets of converging wire guide wings 23, the leading edges of which are notched and spaced apart to embrace the ends of body B and to register with the edges of three different pairs of slots of the body B in which wire coils are to be wound as shown in FIGS. 8, 9, and 10. Said wings 23 also have upper and lower converging faces effective to cause sliding of the wire W into the respective pairs of slots as the flyer arm 12 rotates about the winding head 18.

Having thus generally described the winding apparatus as a whole, reference will now be made in detail to the various sub-assemblies thereof and to the control and operation of the apparatus under the following additional headings:

II. The Headstock Assembly, and the Actuating Mechanism for the Flyer Arm (FIGS. 1 to 4A)
III. The Tailstock and Actuating Mechanism Therefor (FIGS. 1, 2, and 5, 6 and 7)
IV. The Coil Turns Counters, the Brake and Clutch Actuating Mechanism, and the Program Control Cams (FIGS. 11, 12 and 13)
V. The Winding Head (FIGS. 1, 4A, 8, 9 and 10); and
VI. Schematic Wiring Diagram and Operation (FIGS. 11, 12 and 13)

II. *The Headstock Assembly and the Actuating Mechanism for the Flyer Arm (FIGS. 1 to 4A)*

As best shown in FIGS. 1 to 4A, the headstock 5 is in the form of an upstanding hollow box mounted to extend upwardly from the base 1, the flyer drive shaft 9 extending through said headstock and being journalled therein and in the winding head 18. As previously mentioned the shaft 9 has associated therewith the clutch 20 and brakes 21. The drive shaft 9 has a splined connection with the rotating elements (not shown) of the brakes 21, whereby when the brakes 21 are energized the rotating elements thereof are urged into frictional engagement with fixed brake elements mounted on the end walls of the headstock 5.

The drive shaft 9 has splined thereon a collar 24 and the flyer arm 12, and between the collar 24 and flyer arm 12, and fixed to the yoke 25 is a non-rotatable or fixed spur gear 26, the yoke being equipped with rollers 27 engaged with the flanges of the collar 24 whereby the collar 24, and the flyer arm 12 will be shifted axially in response to axial shifting of the yoke 25. The yoke 25 and the spur gear 26 are guided for axial shifting without rotation about the axis of the drive shaft by the secondary shaft 28 which is slidable in the headstock 5.

Mounted on said secondary shaft 28, intermediate the ends thereof, is a clamp 29 to which links 30, 30 are pivotally connected at 31 on opposite sides, the links 30, 30 at their other ends being pivotally connected at 32 to the upper end of a lever 34. The intermediate portion of said lever 34 is mounted on a fixed pivot 35 and its lower end is pivotally connected on the pin 36 of a knuckle 37. The knuckle 37 is connected at one end to the piston rod 38 of a pneumatic cylinder 39 and it can be seen that when the piston rod 38 is moved to the left, the yoke 25, the spur gear 26, and the flyer arm 12 which is connected to the drive shaft will be shifted toward the right to bring certain portions of the winding head 18 into engagement with the slotted body B in which a coil is to be wound.

The knuckle 37 also has an operative connection with a so-called "Hydrocheck" unit 40 which includes the control valve 41. The last-mentioned unit 40 will be described in greater detail in connection with the wiring diagram and the operation of the machine.

The yoke 25 also has secured thereto another shaft 42 extending through the headstock 5 which will be provided with longitudinally adjustable dogs 43, 44 and 45 to cooperate with control switches as best shown in FIGS. 11 and 12.

Figure 4A:
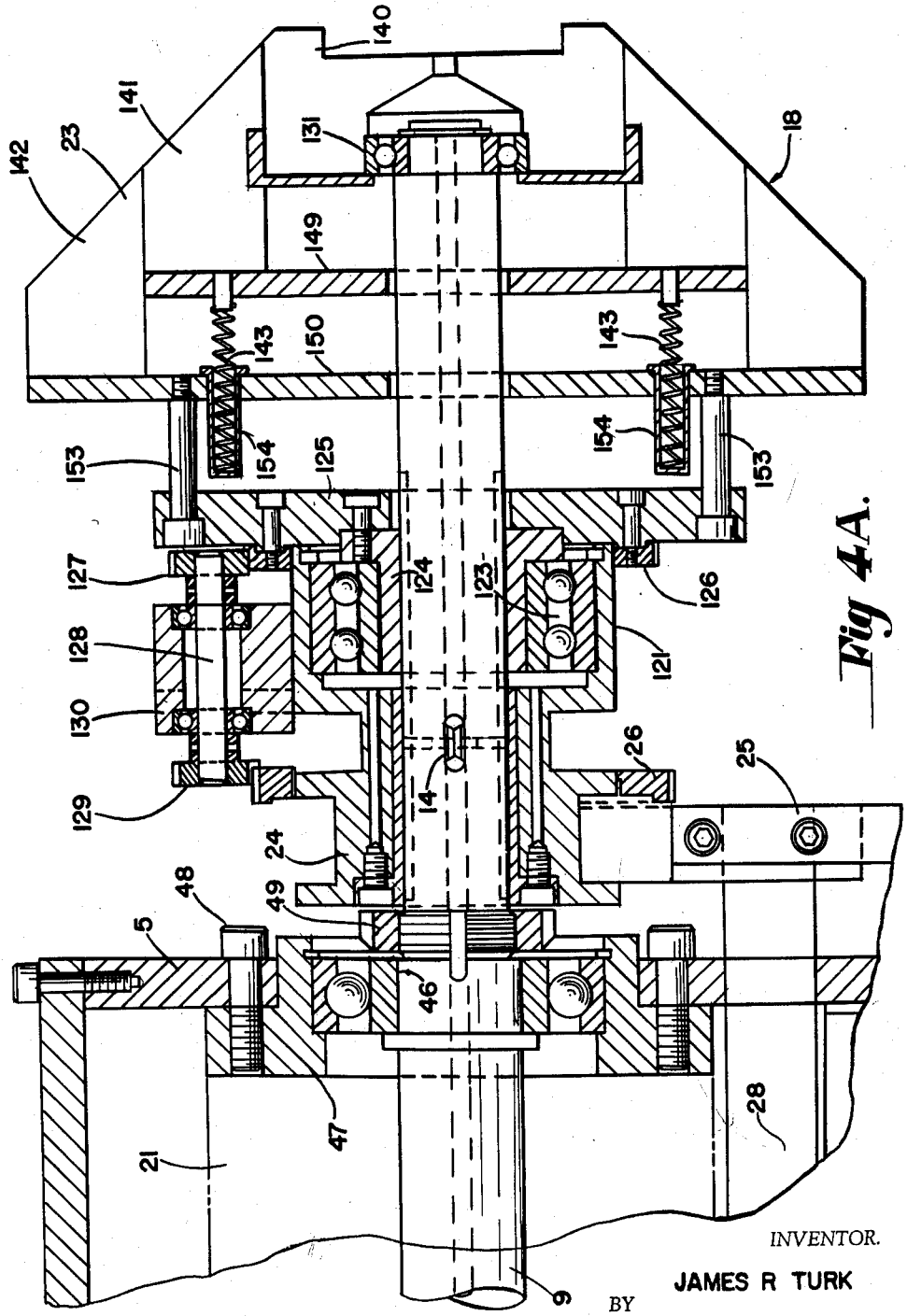
FIG. 4A is a fragmentary enlarged sectional view of the winding head mounted on the rotary drive shaft.

The shaft 9 is rotatably mounted in headstock 5 by means of bearings 46, one of which is shown in FIG. 4A. The outer race of this bearing is secured in brake locating plate 47 which is in turn secured to headstock 5 as by bolts 48. A lock nut 49 is employed threaded on shaft 9 to maintain the bearing 46 in place.

III. *The Tailstock and Actuating Mechanism Therefor (FIGS. 1, 2 and 5, 6 and 7)*

As aforesaid, the slotted body B into paired slots of which wire coils are to be wound comprises a stack of laminations clamped together between screw actuated frustoconical heads 50, 51, said heads 50 and 51 also serving as wire guides effective to shape the coil ends so as to clear the rotor in the completed motor as the flyer arm 12 revolves about the body B. The tailstock 6 as here shown, comprises a rectangular base plate 52 equipped with two sets of rollers 53 and 54 at its four corners which serve to guide the tailstock 6 for longitudinal reciprocation in the ways 56 formed on the base 1. The upright portion 57 of the tailstock 6 carries the holding and indexing mechanism 58 for the slotted body B. Said mechanism 58 comprises horizontal arms or brackets 59 and 60 that have coaxial bosses 61 and 62 at their ends extending into recesses formed in the respective heads 50 and 51, the boss 61 having non-rotating engagement in the recess of head 50. Simultaneous adjustment of the brackets 59 and 60 toward and away from each other to maintain the body B centered with respect to the axis of the flyer drive shaft 9 and winding head 18 irrespective of the stack height of body B is achieved as by having the bottom bracket 59 in threaded engagement with threads of one hand adjacent the lower end of the axially fixed adjusting screw 63 which is rotated as by a hand wheel 64 or the like at its upper end. The top bracket 60 is slide-guided in a guide member 65 which, in turn, has threaded engagement with threads of the opposite hand formed along the upper portion of the adjusting screw 63.

A crank 67 is pivoted at 68 to guide member 65 and has its throw linked to the top bracket 60 by links 69. Accordingly, by rotating the crank 67 as by weighted handle 70, the top bracket 60 may be quickly raised and lowered with respect to the bottom bracket 59 to release or clamp the body B through its heads 50 and 51. The arrangement is preferably such that the crank 67 and links 69 approach deadcenter as the weight 71 of the handle 70 is swung past vertical, whereby the weight 71 locks the mechanism firmly to hold the body B for winding.

Figure 7:
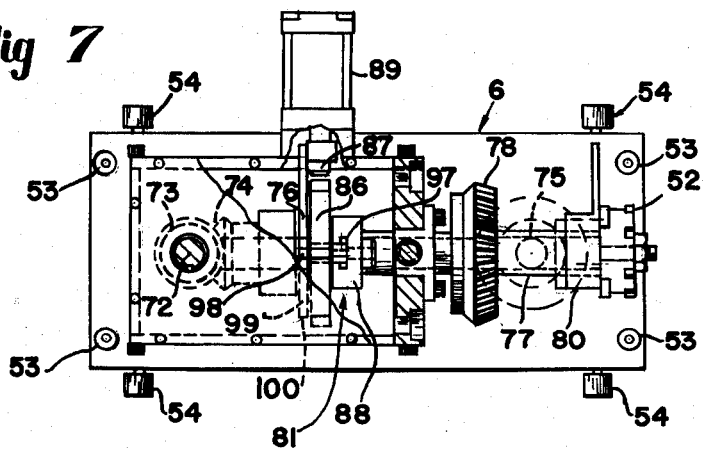
FIG. 7 is a cross-section view taken substantially along the line 7—7, FIG. 6.

As best shown in FIGS. 5, 6 and 7, the shaft 72 which mounts the bottom boss 61 of the clamping mechanism is vertically slidably keyed in a beveled pinion 73 which meshes with a bevel gear 74 keyed on a horizontal shaft 75, said horizontal shaft 75 being journalled in upstanding bearing 76. The gear shaft 75 extends through a hollow miter gear shaft 77 in the form of a sleeve to which the miter gear 78 is keyed. The hollow shaft 77 is journalled in bearings 79 and 80.

The sleeve 77 is free to rotate about the shaft 75 and has mounted thereon a spring loaded pawl drive mechanism generally shown at 81. The miter gear 78 meshes with bevel pinion 82 secured on the drive shaft 83 of a rotary air motor 84. The upper end of the motor shaft 83 has an arm 85 secured thereto adapted to contact limit switches as hereinafter described to control indexing of shaft 72 and thus boss 61 on which the slotted body B is mounted. Adjacent the pawl mechanism 81 driven by the hollow shaft 77 is an indexing plate 86 secured to the shaft 75. As seen in FIG. 5, such indexing plate 86 is provided with four quadrant spaced indentations into which a plunger or shot pin 87 is urged by a pneumatic cylinder 89 to lock the horizontal shaft 75 in its desired indexed position.

The driving pawl mechanism 81 includes the guide block 88 keyed to the hollow shaft 77 providing a guideway diametrically transversely of such shaft and thus the index plate 86 for the spring loaded locator 97. As shown, such locator is provided with a tip 98 adapted to engage the quadrant spaced indentations in the index plate 86. A knock-out plate 99 is integrally secured to the rod of piston 89 and thus the shot pin 87 extending diametrically transversely of the index plate 86 and the extreme edge 100 of such knock-out plate is adapted to engage the tip 98 of the locator 97 to move the locator tip outwardly of the notch in the index plate against the spring pressure to permit the drive pawl mechanism 81 to retract to its original position. The operation of the index mechanism will hereinafter be more clearly described.

To accommodate different diameters of slotted bodies B the tailstock 6 is adjusted horizontally as by means of a screw 90 (FIG. 1) having a hand wheel 91 and having threaded engagement with a block 92 pivotally mounted adjacent the upper end of a lever 93 which is pivotally mounted between its ends to an upstanding bracket 94 on the base 1. The tailstock assembly 6 is moved horizontally to bring the body B forward to winding position and to retract it for indexing or for loading and unloading by means of a pneumatic cylinder 95 mounted on the base 1 and having its piston rod 96 pivotally connected to the lower end of said lever 93.

As later explained, appropriate switches will be provided to control the operation of the tailstock assembly 6 for movement toward and away from the winding head 18, for indexing of the body B, etc., so that once the operation of the machine is initiated it will go through a complete winding cycle wtihout attention on the part of the operator.

IV. *The Coil Turns Counters, the Brake and Clutch Actuating Mechanism, and the Program Control Cams FIGS. 11, 12 and 13)*

Referring to FIGS. 11, 12 and 13 and also to FIG. 1, there is mounted on the leg 7 of the base 1 a control or terminal box 8 which has thereon a "Start-Stop" switch (so identified in FIGS. 1 and 13) and a main rotary "On-Off" switch MDS. FIGS. 11 and 12 especially show the locations of the several switches (identified by the letters "LS" followed by a number) through which cycling of the apparatus is achieved to wind the coil group of one pole in one direction and then to wind the next coil group of the adjacent pole in the opposite direction, etc., for as many poles as are to be provided.

In the present case there are three motor driven, electrically operated counters 101, 102 and 103 which are preset so that when the shortest pitch coil has a predetermined number of turns of wire W, counter 101 initiates shifting of the winding head 18 to commence winding of the second coil, whereupon the second counter 102 takes over and allows the winding operation to continue until the second coil has the desired number of turns, whereupon the second counter 102 conditions the apparatus for winding of the third coil. At the conclusion of the winding of the third coil, the counter 103 brings into effect other components to retract the tail-stock assembly 6, to index the body B to present the next group of slots for winding of three coils therein, and to reverse the drive motor 2 to cause the second group of coils to be wound in the opposite direction. All of this occurs automatically as hereinafter explained in detail.

At the conclusion of the winding of one pole group, the counters 101, 102 and 103 automatically reset to zero to take over the control of the winding of the next pole group.

As aforesaid, the brakes 21 and clutch 20 herein are disposed in the headstock 5 in association with the main drive shaft 9, the clutch 20 being located adjacent the drive pulley 11 and the two electromagnetically operated brakes 21 being mounted adjacent the left and right walls of the headstock. Preferably, the coil elements (not shown) are fixedly mounted and when energized are operative to draw the brake elements (not shown) splined on shaft 9 into frictional engagement with the stationary brake elements thus to promptly arrest the rotation of the drive shaft 9 whenever the brake coils are thus energized. The clutch 20, when energized, disengages the pulley 11 from shaft 9 so that motor 2 continues to run while shaft 9 is braked. In any case, the brakes 21 are required only to overcome the relatively low inertia of the rotary hollow drive shaft 9 and the lightweight flyer arm 12 mounted thereon.

Harmonic program cams 104, 105 and 106 (see FIGS. 11 and 12) are mounted on a reduced diameter extension 107 of shaft 75 to operate switches LS–25, LS–3 and LS–23 respectively and other cams 108, 109, 110 and 111 are mounted on the piston rod 96 of cylinder 95 to operate LS–1, LS–14, LS–5 and LS–19. These latter switches may be positioned to sense the position of the tailstock in either its extended or retracted position as will hereinafter be described in more detail.

V. *The Winding Head (FIGS. 1, 4A, 8, 9 and 10)*

As previously explained, the winding head 18 is generally in the form of a pyramid with slightly rounded corners and having an end face contoured to cylindrical form to match the outside cylindrical surface of the slotted body B. Such concave end face is also notched as at 120 so that portions of the upper and lower converging faces overlie portions of the upper and lower ends of the laminated slotted body B.

In the present case, the winding head 18 is designed to be moved to three different positions (see FIGS. 8, 9 and 10) with respect to the slotted body B so as to wind three concentric coils into three pairs of slots from one pole group.

Referring to FIGS. 1 and 4A, the winding head 18 is mounted on shaft 9 through a hub 121 of flyer arm 12 which is an integral extension of collar 24 and has a dual race ball bearing 123 press-fitted therein. In turn, a sleeve 124 is press-fitted in said ball bearing. A face plate 125 is attached to slidable sleeve 124 and the winding head 18 is bolted on said face plate 125, the shaft 9 being freely rotatable in the sleeve 124 and in the winding head 18. In order to retain the winding head 18 in the proper position as shown, a spur gear 126 is secured to face plate 125 to mesh with the pinion 127 keyed on shaft 128 and the pinion 129 also keyed on shaft 128 meshes with fixed spur gear 26 on yoke 25. Shaft 128 is journalled in the bearing block or boss 130 of hub 121 and thus as the flyer 12 and hub 121 rotate, the epicyclic gearing aforesaid (fixed spur gear 26, pinions 129 and 127 keyed on shaft 128, and spur gear 126) serves to lock the winding head against rotation. The right end portion of the shaft 9 has another bearing 131 thereon which is fitted in winding head 18.

Referring to FIGS. 4A and 8–10, it can be seen that the three sets of wings 23 of winding head 18 comprise an inner part 140, an intermediate part 141 slidable over part 140 and an outer part 142 in which the intermediate part 141 is slidable, springs 143 being employed yieldably to hold parts 141 and 142 in the relative position shown in FIGS. 4A and 8. Part 140 is mounted on bearing 131 always to be in the fixed position shown with respect to shaft 9. Thus, the converging faces of parts 140, 141 and 142 are held in flush condition in the position shown in FIGS. 4A and 8 to provide smooth guide surfaces for wire W. The inner part 140 in addition has a locating rib 144 to engage in the center slot of the pole group to be wound. As shown in FIG. 8, the inner part spans three slots of the body B and forms with parts 141 and 142 a smooth converging wire guide so that as the flyer arm 12 rotates about the winding head 18, the wire W will slide along the converging slide faces and the converging top and bottom faces and thereby be wound to form the shortest pitch coil in the first pair of slots 145, 146.

When a predetermined number of turns of the wire W has been wound in slots 145, 146 to form a coil therein, the parts 141 and 142 are advanced axially with respect to the body B so as to bring the converging side faces of the intermediate and outer parts 141 and 142 into position for winding the second coil into the next adjacent pair of slots 147, 148, whereupon the rotation of the flyer arm 12 will form a coil having a predetermined number of turns into such second pair of slots. This is shown in FIG. 9. The parts 141 and 142 are moved by means of primary yoke shaft 28 moving yoke 25 and collar 24. This moves plate 125 and plates 149 and 150 respectively of the intermediate and outer parts 141 and 142 which plates are held yieldably apart by springs 143.

Finally, as shown in FIG. 10, the part 142 is advanced to its final forward position in which such outer part 142 is advanced with respect to intermediate part 141 compressing springs 143 to bring the converging side faces of part 142 to the body B to guide the wire W for winding in the third part of slots 151, 152 when the flyer arm 12 is again rotated about winding head 18. It is to be noted in FIGS. 9 and 10 that a straight line drawn across the second pair of slots 147, 148 and across the third pair of slots 151, 152 intersects the frusto-conical clamping head and, accordingly, as the wire is wound, the frusto-conical heads 50 and 51 will cause the wire W to slide therealong so that the end loops of the second and third coils will clear the bore of the body B in which a rotor (not shown) rotates when the stator B is completed and installed in a motor frame.

The aforesaid movements of the winding head 18 are under the control of dogs 43, 44, and 45 (see FIG. 11) adjustably mounted on the secondary yoke shaft 42 to engage appropriate switches in sequence to effect shifting of winding head 18 from the FIG. 8 position to the FIG. 9 position and then from the FIG. 9 position to the FIG. 10 position.

After the third coil has been wound in slots 151, 152, appropriate switches will be provided fully to retract the winding head 18 to the FIG. 8 position, whereupon the tailstock assembly 6 is retracted, the body B is indexed to the next pole group and then moved back toward the winding head 18 for commencement of winding of the next concentric coil group in the opposite direction.

The plate 150 of the head 18 is connected directly to the face plate 125 of the headstock by screws 153, which face plate is movable along the shaft 9 by yoke 25. On the other hand the portion 140 is connected to the shaft to be held stationary. The intermediate portion 141 is moved through springs 143 seated within cup-like members 154 in plate 150.

*VI. Schematic Wiring Diagram and Operation*
*(FIGS. 11, 12 and 13)*

Referring essentially to FIGS. 11, 12 and 13, and especially to FIGS. 11 and 12, it will be seen that the automatic operation of the machine is obtained primarily by critically positioned limit switches. Within the headstock 5, there is provided a limit switch LS–7 which is actuated by dog 43 on shaft 42 movable with the yoke 25. The dog 44 depends from the shaft 42 and is engageable with limit switches LS–8 and LS–12. The dog 45 is positioned to engage limit switches LS–9 and LS–13. These limit switches may be of a conventional type and are preferably mounted as by the brackets illustrated on the interior of the headstock housing. It will now be seen that limit switch LS–7 will be closed in the retracted position of the winding head wherein the wings 140 are employed to guide the wire within closely spaced slots; the limit switches LS–8 and LS–12 will be closed by dog 44 in the intermediate position of the winding head when the wings 141 are employed to guide the wire into a slightly more widely spaced pair of slots; and limit switches LS–9 and LS–13 will be closed by dog 45 when the wings 142 are employed to guide the wire into the most widely spaced pair of slots in the final winding operation of that sequence.

Also mounted on the interior of the housing of the headstock 5 by suitable brackets are two limit switches LS–10 and LS–16 actuated by harmonic cams 160 and 161 respectively on the drive shaft 9. (Note especially FIG. 3.) Limit switch LS–16 is employed to send impulses to the counters 101, 102 and 103 and limit switch LS–10 is employed to control a relay as hereinafter more fully described.

On the front of the base 1 as seen more particularly in FIG. 12 are three toggle operated switches 163 (coil selector), LS–4, and LS–2, and four push button switches LS–11, LS–17, adapted for simultaneous actuation, LS–15, and LS–22. These switches are utilized primarily for the purpose of providing manual overrides for the various functions of the machine.

On the upright 57 of the tailstock 6 is a pair of adjustable limit switches LS–20 and LS–21 arranged to be actuated at the ends of the arc of movement of arm 85 of the rotary air indexing motor 84.

Secured to the side of bearing 80 by a suitable bracket are limit switches LS–25, LS–3 and LS–23 arranged to be actuated by the cams 104, 105 and 106 respectively, which cams are mounted on the reduced diameter extension 107 of shaft 75. It will be understood that such cams may be separately mounted thereon or mounted unitarily thereon in the form of a program disc.

Mounted on the clevis of piston rod 96 of the tail-stock actuating cylinder 95 are four cams 108, 109, 110 and 111 operating respectively limit switches LS–1, LS–14, LS–5 and LS–19 which are mounted on the base 1. These limit switches may be arranged to be actuated either in the advanced or retracted position of piston rod 96.

Mounted on the side of the machine is a limit switch LS–24 adapted to be contacted by an arm movable with shot pin 87 as the result of actuation of the cylinder assembly 89. A limit switch LS–18 is mounted on bearing 76 to be engaged by a cam in the form of a button head screw 162 mounted on knockout plate 99 movable with shot pin 87 also actuated by cylinder assembly 89. Thus switches LS–24 and LS–18 relate the advance and retracted positions of the shot pin 87.

It can now be seen that the various position responsive switches as well as the manually controlled switches are strategically arranged to provide a complete automatic and manual control for the machine as will hereinafter now be described.

Now, starting at the upper portion of FIG. 13, the main switch is identified by the letters "MDS" which closes the circuits for lines L1, L2 and L3 for the reversible motor 2. The lines L1 and L2 may be tapped, as shown, by the primary leads of a transformer TR–1. Such transformer TR–1 provides a 115 volt A.C. output and across the secondary circuit L4 and L5 of such transformer is the motor control circuit which includes the normally opened contacts 170 of main control relay CR–1, the manually operated "start-stop" switch, the safety switch LS–1 which, as will be recalled, is operated by the rod 96 of the tailstock cylinder 95, the manual toggle switch or motor switch LS–2, and the motor forward and reverse switch LS–3 which is controlled by cam 105 mounted on the reduced diameter portion 107 of shaft 75. All of the aforementioned switches are connected in series such that all must be closed before the motor controls will operate. Parallel circuits from the limit switch LS–3 contain the contacts of manually operated toggle switch LS–4 which provides a manual override for the forward and reverse limit switch LS–3. Thus with the LS–3 switch in the position shown and the LS–4 switch in the position shown, the circuit will be fed to the reverse motor control R and actuation of LS–4 will reverse the flow of current and thus the direction of rotation of motor 2. Conventional motor overload controls are provided in series with the entire motor control circuit as shown at 171 and 172.

Before proceeding further with the circuits connected between L4 and L5 of the circuit provided by TR–1, the lines L1 and L2 are provided with a further stepdown transformer TR–2 providing an 8 volt A.C. output. This circuit may be between L6 and ground and controls various solenoid valves which in turn control the operation of the winding head motor 39, the tailstock actuating cylinder 95, the shot pin or plunger cylinder 89, and the indexing air motor 84.

Returning to the circuit provided by L4 and L5, it will be seen that the counters 101, 102 and 103 are connected therebetween. Typical counter circuits have been illustrated with each counter circuit including a counting solenoid 173 and a reset motor 174. The number 7 terminals of the respective counters are each connected to the control relay CR–2 through respective switches 175, 176 and 177. These switches are all respectively controlled by control relays CR–5, CR–6 and CR–7, all of which are in parallel, and are controlled by respective limit switches LS–7, LS–8 and LS–9. These same control relays CR–5, CR–6 and CR–7 function to close normally open contacts 178, 179 and 180 connecting the number 1 terminals of each of the counters with the main L5. It is noted that the terminals No. 2 of each of the counters are connected directly to the main L4 and the terminals No. 4 of each of the counters are connected directly to the main L5. All of the number 1 terminals of the counters are connected in parallel with the switches 178, 179 and 180 and in series with the normally closed contacts 181 operated by control relay CR–8 and limit switch LS–16 controlled by harmonic cam 161 mounted on the winding head shaft 9.

It will be recalled that the limit switch LS–7 controlling CR–5 is actuated by the dog 43 mounted on shaft 42, which switch is closed in the retracted or farthest to the left position of the winding head as viewed in FIGS. 1 and 3. Limit switch LS–8 is controlled by the intermediate dog 44 on such shaft 42 and limit switch LS–9 is controlled by dog 45. Thus the control relays CR–5, CR–6 and CR–7 operate in rsponse to the positions of the winding head thus to control which of the counters 101, 102 and 103 shall be conditioned to actuate through switches 178, 179 and 180 respectively and which of the three counters will energize CR–2 through respective switches 175, 176 and 177. It can readily be seen that the switch LS–16 is the pulse feed switch which will be effective to feed a pulse to the counter chosen by the selective closing of switches 178, 179 and 180.

One of the functions of CR–2 is to open the normally closed contacts 182 which is in series with limit switch LS–10 and control relay CR–3. Manual switch LS–11 is in parallel with the switches 182 and LS–10 to provide a manual override. The limit switch LS–10 is operated by harmonic cam 160 mounted on the shaft 9 such that the switch 182 will function only to energize CR–3 in the proper position of the shaft 9 or at the end of a complete revolution. The control relay CR–3 functions to open normally closed switch 183 to deenergize the brake coils 184 to apply the brakes 21 to stop rotation of the winding head. Whereas there is only one brake coil illustrated, it will be understood that coils for both brakes may be connected in parallel and selectively applied depending upon the requirements of the particular machine. Control relay CR–3 also functions to open normally closed contacts 185 to deenergize coil 186 of the "Hydrocheck" unit 40 opening valve 41 thus permitting actuation of cylinder 39 and rod 38 to move the rod 28 and thus yoke 25 to reposition the winding head 18.

Control relay CR–4 functions to energize and deenergize clutch coil 187 through contacts 188 in series therewith. Limit switches LS–15 and LS–14 in parallel with each other and each in series with CR–4 are controlled manually and by movement of the tailstock respectively. Also in the CR–4 circuit is a capacitor-rectifier unit 190 and limit switches LS–12 and LS–13 controlled respectively by the intermediate dog 44 and the full-in dog 45 on the shaft 42 of yoke 25. Energization of the control relay CR–4 functions to close switch 181 to commence counting by the selected counter through energization of control relay CR–8 by closing the contacts 191. As will hereinafter be pointed out, CR–4 also closes contacts to close an orifice in valve 41 of "Hydrocheck" unit 40 to lock the winding head in the selected position.

A rectifier 192 supplies 90 volt D.C. current to mains L7 and L8 for the clutch and brake coils 187 and 184 respectively. A potentiometer 193 is employed to control the current passing through the clutch coil 187 and capacitors 194 and 195 are employed in parallel with the clutch coil 187 and brake coil 184 respectively.

In the circuit provided by TR–2 as shown on the right side of FIG. 13, there are first the solenoid winding head and tailstock valves 200 and 201 of which the winding head valve 200 has an advance solenoid A and a retract solenoid R for controlling actuation of the winding head 18 through the cylinder 39 and of which tailstock valve 201 has a retract solenoid R for controlling retraction of the tailstock. The solenoids A and R of valve 200 and the solenoid R of valve 201 are controlled by the coil selector switch 163, and the switches 202, 203 and 204 which are respectively controlled by control relays CR–5, CR–6 and CR–7. Also, parallel connected switches 205 and LS–17 are in series with the parallel switches 202, 203 and 204. The switch 205 is controlled by control relay CR–2 which is actuated by the selected counter and the limit switch LS–17 is manually controlled to provide an override. It is noted that the advance solenoid A of valve 201 is shown at the bottom of FIG. 13 and is controlled by parallel connected switches LS–22 and LS–23 with LS–23 being controlled by cam 106 mounted on the extension of shaft 75. LS–22 is a manually controlled push-button switch providing an override control for LS–23.

Next, in the 8 volt circuit is the coil 206 of the valve 41 of the "Hydrocheck" unit 40 controlled by contacts 208 which will be closed by relay CR–4 and opened by relay CR–3. Coil 206 cooperates with coil 186 in the 115 volt circuit such that engagement of the clutch energizes the 115 volt coil 186 to lock the "Hydrocheck" unit and accordingly the winding head in the set position through the clutch control relay CR–4, and control relay CR–3 braking shaft 9 will release the "Hydrocheck" unit to permit movement of the winding head. The two coils, one in the 115 volt circuit and the other in the 8 volt circuit are employed to open and close an orifice in valve 41. The "Hydrocheck" unit is, of course, an oil filled cylinder device which permits movement of the rod 38 only when the 115 volt coil 186 is deenergized. When such coil is energized, it pushes a tapered pin into the orifice of valve 41 blocking the displacement from the right hand portion of cylinder 40 and thus preventing movement of rod 38. When the brake stops the flyer, the valve is deenergized and the tapered pin will be pulled from the orifice by coil 206 releasing the "Hydrocheck" unit.

Also, in the 8 volt circuit are the valves 210 and 211 controlling, respectively, cylinder 89 for the plunger or shot pin 87 and air motor 84 for indexing the body B. The advance solenoid of valve 210 is controlled through LS–21 which is mounted on the upright 57 of the tailstock to be engaged by the arm 85 of air motor 84. The retract solenoid of valve 210 is controlled by switches LS–20 and LS–24 in series, with switch LS–20 also being actuated by the movement of arm 85 on air motor 84 and the switch LS–24 being actuated by movement of the piston-cylinder assembly 89 moving the shot pin 87.

The advance solenoid of the valve 211 is controlled through switch LS–19 which is actuated by movement of the tailstock or cylinder 95. In parallel with the switch LS–19, there is switch LS–25 in series with switch LS–20. Switch LS–25 is actuated by cam 104 on the extension of shaft 75. The retract solenoid of the valve index 211 is operated by switch LS–18 which is controlled by operation of the shot pin or plunger engaging the index plate 86 on shaft 75.

*Operation*

Now briefly going through a complete cycle of operation of the machine, it is assumed that the counters 101, 102 and 103 have been preset and that other preliminaries have been taken care of such as the adjustment of the movements of the winding head, adjustment of the movements of the tailstock 6 through adjusting screws 63 and 90 as well as the brackets 59 and 60 holding the spider assembly or body B, adjustment of the rotary air index motor 84 and the stops for limit switches LS–20 and LS–21 respectively engaging arm 85 to index the body or spider B for winding the desired pole groups, and provision of the proper index plate 86 for engagement with the shot pin or plunger 87 of the cylinder 89. Other preliminaries are, of course, the placing of the body B on the bottom spindle or boss 61 and securing it by rotating the crank 67 thus lowering top spindle or boss 62 down into the clamping head 51. Also, the wire W is threaded through one slot of the initial short pitch coil and secured. The machine is then turned on and because LS–23 is depressed by the cam 106 on the shaft 75, the advance coil A of the tailstock valve 201 is energized causing the piston rod of air motor 95 to advance, rotating lever 93 in a counterclockwise direction and thereby bringing the body B into contact with the initial section 141 on the winding head 18. The extension of the tailstock closes limit switch LS–5 energizing control relay CR–1 closing switch 170 and the closing of start-stop switch will then energize the motor control in either the forward or reverse direction selected by limit switch LS–3. At this time, as the body B contacts the winding head 18, LS–14 is depressed energizing CR–4 to energize clutch coil 187 by closing switch contacts 188. The auxiliary functions of CR–4 also lock the "Hydrocheck" unit in place by closing switch 185 and complete the circuit through pulse switch LS–16 to the selected counter by closing switch 188 by energizing CR–8 through the closing of switch 191. Since the clutch 20 is now engaged, motor 2 will rotate the flyer arm 12 in the selected direction thereby causing the wire W to be wound into the slots 145, 146 of the short pitch coil as directed by the winding head 18.

It will be here noted that the contacts as well as the relays CR–3 and CR–4 are in essence one unit with the relays being mechanically interlocked. Accordingly, if the relay CR–3 is opened, the relay CR–4 will be latched closed and such relay cannot be opened until the relay CR–3 is energized. The same is also true of CR–4, the relay CR–3 being held closed until the relay CR–4 is energized. For example, switch 185 may be termed a normally closed switch operated by brake relay CR–3 but such will in reality be closed by the energization of the clutch relay CR–4, releasing the relay CR–3 to close such contact.

Since the winding head will be in its retracted position or the position more clearly seen in FIGS. 8 and 4A, the dog 43 on shaft 42 will close limit switch LS–7 energizing CR–5. This closes switches 175, 180 and 202. Closing the switch 175 prepares the circuit from counter 101 to CR–2 and the closing of switch 180 conditions the counter 101 only to receive the pulses of switch LS–16. After a predetermined number of turns of the shaft 9 which will be preset on counter 101, the contacts 6 and 7 of the counter will close momentarily, energizing control relay CR–2 to close switch contacts 182 to energize CR–3 at the proper point of revolution of the shaft 9. CR–2 also closes switch 205 which will then energize the advance solenoid A of valve 200 through closed switch 202 and the coil selector switch 162. The energization of CR–3 also opens switch 185 to deenergize coil 186 of the "Hydrocheck" unit permitting the energization of the advance solenoid A of valve 200 causing piston rod 38 of cylinder 39 to move to advance the winding head 18. This movement imparts a forward motion to shaft 28 by means of the lever 34. The winding head will then assume its FIG. 9 position wherein sections 141 and 142 have moved forward until the dog 44 depresses LS–12 discharging the capacitor of unit 190 energizing clutch 20 and again closing the "Hydrocheck" unit through switch 208 to lock the winding head in the intermediate position. The unit 190 is employed to guarantee accuracy of travel of the winding head. Thus when the winding head is moving forward and it is desired to stop it, a charge will be built up in the capacitor through the rectifier and when the winding head depresses LS–12 or 13 as the case may be, the capacitor will immediately discharge into the CR–4 coil which energizes the coil 186 locking the winding head in place. The capacitor thus creates a surge instantaneously to latch the winding head in place and release the brake and engage the clutch. It will be understood that the brake and clutch relays are mechanically interconnected to operate alternately as aforedescribed such that when the clutch is energized, the brakes will be released and that when the brakes are energized, the clutch will be disengaged.

The movement of the winding head to the intermediate position closes switch LS–8 energizing control relay CR–6. This closes switch 203, switch 176 and switch 179, the latter two preparing the counter 102 for operation to energize the control relay CR–2 at the completion of a certain number of revolutions of the shaft 9. The switch 203 is connected to perform the same function as switch 202, that is, to energize advance solenoid A of valve 200 when the control relay CR–2 is energized by the counter 102 to close switch 205. Counter 102 will then count the number of coils wound in slots 147 and 148 as shown in FIG. 9 and the completion of the coil will then energize CR–2, the actions resulting from the energization of CR–2 being the same as those as previously described with the brakes being engaged and the clutch disengaged while the advance solenoid A of valve 200 is energized to move the winding head to the position where dog 45 on shaft 42 closes limit swtich LS–13 thus to reenergize CR-4 to engage the clutch. The extended position of the winding head closes LS-9 to energize control relay CR-7 closing switches 178 and 177 preparing the counter 103 to energize the control relay CR-2 at the completion of the predetermined number of revolutions of the shaft 9 as measured by pulse switch LS-16. Control relay CR-7 also closes switch 204 which prepares a circuit to the retract solenoid R of valve 200 as well as to the retract solenoid R of tailstock valve 201. In the extended position, the winding head assumes the position shown in FIG. 10 and spans the slots 151 and 152 such that the rotation of the flyer arm will wind a coil therein. As the counter 103 energizes the control relay CR-2, the brakes will be engaged and the clutch disengaged and the "Hydrocheck" mechanism released such that the retraction of the winding head will be caused by energization of the retract solenoid R of valve 200 and the energization of solenoid R of valve 201 will retract the tailstock from the winding head.

The movement of the tailstock to the retracted position closes LS-19 to energize the solenoid A of index valve 211 to cause the air motor 84 to rotate the body B about its axis to present further pairs of slots to the winding head. The rotation of the air motor 84 causes the hollow shaft or sleeve 77 to rotate rotating the spring loaded locator and notch 98 until such engages within a notch in the index plate 86 rotating such plate and the shaft 75 and accordingly the shaft 72 and the body B. Rotation of the shaft 75 will continue until the arm 85 engages LS-21 to advance the shot pin into the aligned notch on the index plate 86. Advancement of the shot pin closes limit switch LS-18 to energize the retract solenoid of valve 211 to return the index motor to its original position. In such original position, the limit switch LS-20 is closed to retract the shot pin through closed limit switch LS-24. When the shot pin is advanced, the tip 100 of the knock-out plate 99 will move the locator tip 98 out of the notch against the spring loading pressure of locator plate 97 to permit return of the locator plate to its original position as shown in FIG. 6. If when the switch LS-20 is closed by the turning of arm 85, the switch LS-25 also is closed by the selected program cam on shaft 75, the advance solenoid A of valve 211 again will be energized to cause rotation of the body B through the identical arc. Such program cam can be employed with switch LS-25 when it is desired to wind a two pole motor, for example, having concentric poles on opposite sides of the body. For a four pole motor where it is desired only to index the body B through 90°, the limit switch 25 and the associated program cam can be omitted. At the new position of shaft 75, as the result of the indexing thereof, the selected program cam for switch LS-23 again closes such switch causing the tailstock advance solenoid A to advance the tailstock into position to repeat the hereinabove described cycle.

It has been found that by placing different program cams on the shaft 75, it becomes possible to wind 2, 4, 6 or even 8 poles completely automatically. The selection of the index program disc 86 also can be varied to provide any number of indentations which will be engaged by the locator 97 to cause rotation of shaft 72 through the desired arc even though the motor 84 may index the shaft 77 through a larger arc. Control of the selection of the program cams, the disc 86 and the points at which the arm 85 will contact the limit switches LS-20 and LS-21 can provide an extreme variety in the program of operation of the indicated machine.

Other modes of applying the principle of the invention may be employed, change being made as regards the details described, provided the features stated in any of the following claims, or the equivalent of such, be employed.

I, therefore, particularly point out and distinctly claim as my invention:

1. A winding head for a coil winding machine comprising a base having opposite converging guide faces and adapted to be positioned against an externally slotted body to guide wire into a pair of slots of such body that are aligned with the edges of said guide faces; and a sliding section in said base movable from retracted position in said base to protracted position, said sliding section having guide faces which, in the protracted position of said sliding section, are a continuation of the guide faces of said base for guiding the wire into a different pair of slots of such body.

2. The winding head of claim 1 wherein the guide faces of said sliding section are, in said retracted position, nested in the guide faces of said base.

3. The winding head of claim 1 wherein yet another sliding section is movable from retracted position in said first-mentioned section to protracted position, said another sliding section having guide faces which, in the protracted position of said another section, are a continuation of the guide faces of said base and said first section for guiding the wire into a third pair of slots of such body.

4. In a coil winding machine including holder means for mounting an externally slotted body to expose the slots therein for winding of wire coils in selected pairs of such slots; a winding head provided with a plurality of pairs of converging guide faces, a flyer arm rotatable about said winding head, means for feeding a wire from said flyer arm whereby the wire when secured at its end in fixed position relative to such body slides along said faces and is guided thereby into the selected pair of slots aligned therewith, means mounting said pairs of converging guide faces for movement relative to said body to span different pairs of slots; first counter means to control the number of revolutions of said flyer arm; and means responsive to the spanning of such selected pair of slots by said guide faces to select said first counter means, said flyer arm being mounted for rotation on a drive shaft, drive means for said shaft, said winding head being mounted on said shaft and held against rotation; and first counter responsive means to stop rotation of said shaft thereby to wind a predetermined number of coils in such selected pair of slots; said winding head including a first pair of guide faces fixed with respect to the end of said shaft, and a second pair of guide faces movable axially of said shaft, and means responsive to said first counter means axially to move said second pair of guide faces to contact said body to span a second pair of slots.

5. A machine as set forth in claim 4 including means responsive to the spanning of such second pair of slots to select second counter means to control the number of coils to be wound in such second pair of slots.

6. A machine as set forth in claim 5 including a third pair of guide faces movable axially of said shaft, and means responsive to said second counter means to move said third pair of guide faces to contact said body to span a third pair of slots.

7. A machine as set forth in claim 6 including means responsive to the spanning of such third pair of slots to select tertiary counter means to control the number of coils to be wound in such third pair of slots.

8. A machine as set forth in claim 7 including means responsive to said tertiary counter means axially to retract said second and third pairs of converging faces from said body.

9. A machine as set forth in claim 8 including means responsive to said tertiary counter means to index said body to present further selected pairs of slots to said winding head.

10. A coil winding apparatus comprising a holder adapted to mount an externally slotted body so as to expose the slots thereof for winding of wire coils in selected pairs of slots, a winding head provided with a plurality of relatively movable sections each having sets of guide faces adapted to span different pairs of slots; a flyer arm rotatable about said winding head, means operative for feeding a wire from said flyer arm whereby the wire, when secured at its end in fixed position relative to such body, slides along a selected set of said faces and is guided thereby into the pair of slots aligned therewith, means for so rotating said flyer arm; and means operative relatively to shift said movable sections aligning the respective sets of guide faces to span the selected pairs of slots in such body.

11. The apparatus of claim 10 wherein indexing means are provided to index said holder and thus position the body held thereby for winding of coils into other selected pairs of slots.

12. The apparatus of claim 10 wherein the guide faces of the respective sections are substantially flush when winding a coil of the shortest pitch.

13. A coil winding apparatus comprising a holder adapted to mount an externally slotted body so as to expose the slots thereof for winding of wire coils in selected pairs of slots; a winding head provided with a plurality of relatively movable sections each having sets of guide faces adapted to span different pairs of slots; a flyer arm rotatable about said winding head, means operative for feeding a wire from said flyer arm whereby the wire, when secured at its end in fixed position relative to such body, slides along a selected set of said faces and is guided thereby into the pair of slots aligned therewith, means for so rotating said flyer arm; and means operative relatively to shift said movable sections aligning the respective sets of guide faces to span the selected pairs of slots in such body; said means for rotating said flyer arm comprising a power-driven shaft to which said flyer arm is secured and through which the wire is adapted to be fed longitudinally, said shaft being journalled in said winding head; and gear means provided to hold said winding head against such rotation whereby said winding head is maintained in fixed rotative position with respect to said holder and the body held thereby, said gear means comprising a first gear surrounding said shaft and fixed against rotation, a second gear surrounding said shaft and fixed to said winding head, a jack shaft mounted for rotation with said flyer arm, and pinions keyed on the ends of said jack shaft in mesh respectively with said first and second gears thereby to maintain said winding head against rotation.

14. The apparatus of claim 13 wherein said first gear is secured on a non-rotary axially reciprocable yoke that engages said power-driven shaft to shift the latter together with said flyer arm and relatively to shift said movable sections.

References Cited in the file of this patent

FOREIGN PATENTS 838,318  Great Britain _____ June 22, 1960